(12) United States Patent
Doshi

(10) Patent No.: US 7,122,255 B2
(45) Date of Patent: Oct. 17, 2006

(54) MULTILAYERED COMPOSITE POLYAMIDE ARTICLES AND PROCESSES FOR THEIR PREPARATION

(75) Inventor: Shailesh Ratilal Doshi, Kingston (CA)

(73) Assignee: E. I. du Pont Canada Company, Mississauga (CA)

( * ) Notice: Subject to any disclaimer, the term of this patent is extended or adjusted under 35 U.S.C. 154(b) by 127 days.

(21) Appl. No.: 10/731,513

(22) Filed: Dec. 9, 2003

(65) Prior Publication Data

US 2004/0191451 A1    Sep. 30, 2004

Related U.S. Application Data

(60) Provisional application No. 60/432,291, filed on Dec. 10, 2002.

(51) Int. Cl.
  *B32B 27/06*  (2006.01)
  *B32B 27/34*  (2006.01)
  *B29D 22/00*  (2006.01)
  *B29D 23/00*  (2006.01)

(52) U.S. Cl. ............... 428/474.9; 428/34.1; 428/35.7; 428/35.9; 428/36.9; 428/36.91; 428/474.4; 428/474.7

(58) Field of Classification Search ............... 428/34.1, 428/35.7, 35.9, 36.9, 36.91, 474.4, 474.7, 428/474.9
See application file for complete search history.

(56) References Cited

U.S. PATENT DOCUMENTS

| 5,219,003 A | 6/1993 | Kerschbaumer |
| 5,258,213 A | 11/1993 | Mugge et al. |
| 5,425,817 A | 6/1995 | Mugge et al. |
| 6,989,198 B1 * | 1/2006 | Masuda et al. .......... 428/474.9 |

FOREIGN PATENT DOCUMENTS

| EP | 530 538 B1 | 5/1997 |
| WO | WO 98/10927 | 3/1998 |
| WO | WO 98/11398 | 3/1998 |
| WO | WO 02-29347 A2 | 4/2002 |

OTHER PUBLICATIONS

Derwent Abstract, EP 470605, EMS Inventa AG, "Polyamide Pipe, Especially . . . Glass Fibre-Reinforced".

* cited by examiner

*Primary Examiner*—Harold Pyon
*Assistant Examiner*—Patricia L Nordmeyer

(57) ABSTRACT

Multilayered polyamide composite articles comprising at least three layers that comprise aliphatic and semi-aromatic polyamides and that is better able to retain its mechanical properties at high temperatures and over long times are disclosed. Layers comprising aliphatic polyamides may optionally contain oxidation stabilizers. The articles may be in the form of tubes incorporated into a heat exchanger. Processes for their preparation are also provided.

5 Claims, 2 Drawing Sheets

Variation of Young's modulus of the tube samples with temperature

Variation of tensile strength of the tube samples with temperature

MULTILAYERED COMPOSITE POLYAMIDE ARTICLES AND PROCESSES FOR THEIR PREPARATION

CROSS REF RENC TO RELATED APPLICATIONS

This applicatin claims the benefit of U.S. Provisional Application No. 60/432,291, filed Dec. 10, 2002.

FIELD OF THE INVENTION

This invention is related to a multilayered polyamide composite article that is able to better retain its mechanical properties at high temperatures and over long times. This invention is more specifically directed to articles of three or more layers of polyamide, and assemblies such as heat exchangers incorporating such articles in the form of tubes.

BACKGROUND OF THE INVENTION

Polyamides are attractive materials to use in many demanding applications because of their mechanical properties and chemical resistance. Many of these applications involve use at high temperatures. For example, components used in the automotive engine compartment such as ducts, fans and fan shrouds, manifolds, tubes, etc. require operation at high temperatures. There is ample evidence in the patent literature directed to the use of plastic tubes, panels, and other structures for fabrication of heat exchangers that can operate at high temperatures. Heat exchangers can take a variety of forms; one such construction takes the form of a plurality of tubes arranged in a parallel fashion and secured at their free ends, such that fluid can flow through channels formed therein. In all of these applications, it is desirable that the structures and components retain their mechanical properties such as stiffness, strength and creep resistance at high temperatures.

The change in properties of a polymer with temperature is governed by its glass transition temperature. This is a temperature characteristic of a polymer's molecular architecture, when molecules undergo a transition from a glassy state to a rubbery state. The mechanical properties such as stiffness and strength exhibited by a polymer in the glassy state are generally significantly higher than those in the rubbery state.

Another issue with the use of plastic components at high temperatures is that the rate of oxidative degradation is higher, leading to loss of mechanical properties at a faster rate. During oxidative degradation, oxygen diffuses into the exposed polymer surface, and reacts with the polymer molecules. The degradation is thus initiated, and is more concentrated near the surface of an exposed part, and causes surface embrittlement. Surface embrittlement has a severe effect on the physical properties of the whole part since external bending and flexing loads typically give rise to high stress concentrations at the surface.

A common approach to retarding oxidative degradation of polymers is to use anti-oxidation additives. These are used at low levels, and often tailored for use in a particular polymer. They are normally dispersed throughout the polymer matrix, and a uniform distribution is used to provide overall stability.

The oxidation stabilizers used in polyamides generally fall into three groups: (i) organic stabilizers based on aromatic amines, (ii) organic stabilizers based on hindered phenols sometimes in combination with phosphorous based compounds, and (iii) inorganic stabilizers based on copper and halogen compounds. The organic stabilizers are often not suitable for incorporation into polyamides that need to be processed at temperatures close to 300° C. or higher, as they tend to volatilize or decompose. Copper based inorganic stabilizers are also not suitable because they lead to degradative reactions at these high temperatures. This is especially true in processes such as extrusion, blow molding, casting, film blowing etc. that involve exposure of the polymer melt to atmospheric conditions.

U.S. Pat. No. 5,258,213 describes a multilayered thermoplastic composite comprising a polyamide layer, a polyester layer, and an adhesion promoter. This composite does not have any particular thermal or oxidative stability. U.S. Pat. No. 5,425,817 describes a multilayered plastic pipe that comprises an inner and outer layer of at least one polyamide and at least one intermediate layer comprising a crystalline polyester. Again, no particular advantages in thermal or oxidative stability are attributed to this pipe. EP Patent Application 0 470 605 discloses a pipe with low-temperature impact resistance consisting of at least three layers of mutually compatible polyamides, at least one of which is glass-reinforced. No advantages in oxidative stability and long-term property retention at continuous exposure to high temperatures are described. U.S. Pat. No. 5,219,003 discloses a tube with low-temperature impact resistance that is suitable for conveying motor vehicle engine fuel and that comprises three layers that are made from at least two mutually compatible polyamides. The inner and outer layers contain impact modifiers and the middle layer contains substantially none.

It is seen that articles fabricated from polyamides that simultaneously offer improved retention of mechanical properties at high in-use temperatures and stabilization against oxidative degradation are not available. The object of the present invention is to provide multi-layered composite articles comprising a plurality of layers of polyamides and process for the manufacture of these articles such that the problems associated with the incorporation of commonly available oxidation stabilizers into the article and retention of the article's mechanical properties at high in-use temperatures are simultaneously averted. This and other objects, features and advantages of the invention will become better understood upon having reference to the detailed description of the invention herein.

SUMMARY OF THE INVENTION

There is disclosed and claimed herein multilayered articles comprising a plurality of layers of polyamides and arranged to include two surface layers and one or more inner layers, and wherein said surface layers further comprise one or more aliphatic polyamides and wherein at least one of said inner layers comprises a semi-aromatic polyamide derived from at least about 25 mole percent of aromatic monomers.

There is also disclosed and claimed herein processes for the manufacture of the multilayered articles of the invention. Such processes comprise melt extruding each of said plurality of layers of polyamides under processing conditions suitable for each layer, and thereafter combining said layers into a selected multilayered configuration.

The invention will become better understood upon having reference to the figures of the case as follows.

IN TH FIGURES

DETAILED DESCRIPTION OF THE INVENTION

Figure 1:
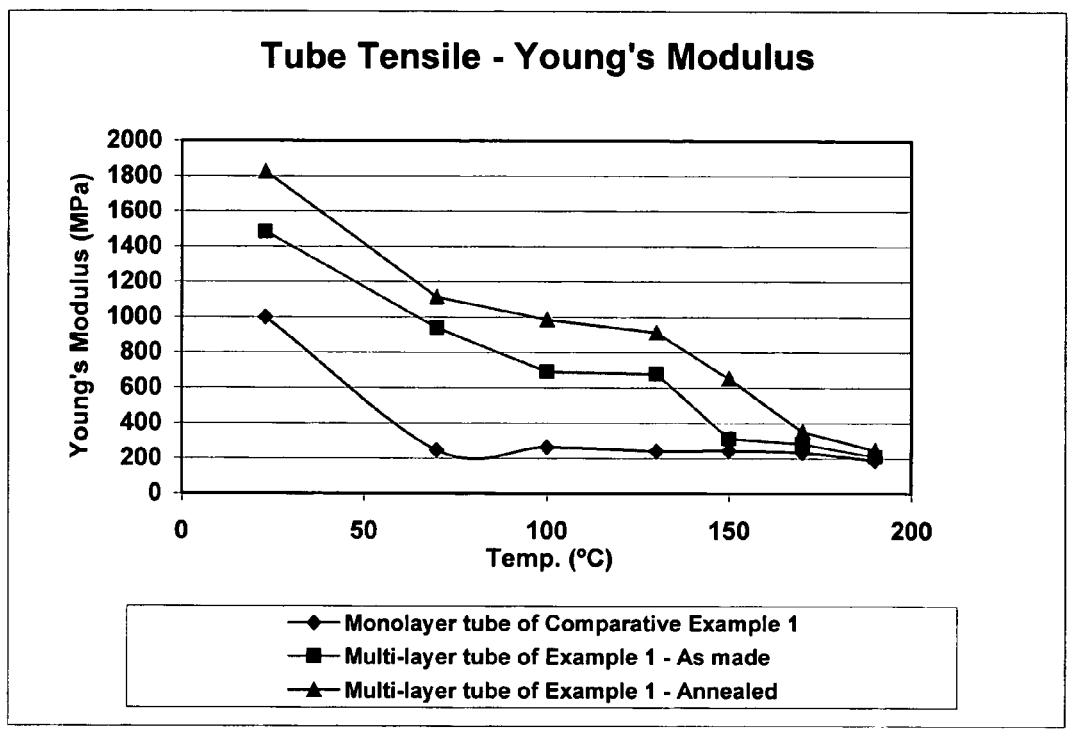
FIG. 1 is a graph depicting the variation of the Young's modulus with temperature of tube samples of this invention and a comparative example.

The present invention provides a multilayered composite article that can be both stabilized with oxidation stabilizers and made from polymer compositions containing polyamides that exhibit enhanced retention of mechanical properties at high temperatures. By "multilayered composite article" is meant an article that comprises a plurality of laminated layers of polyamides that are arranged to include two surface layers and one or more inner layers. Each of the surface layers comprises one or more aliphatic polyamides and at least one of the inner layers comprises a semi-aromatic polyamide derived from at least about 25 mole percent of aromatic monomers.

The high in-use temperature of an article is dependent on the application. For example, several automotive underhood applications require the article to operate at temperatures of 100° C. or higher. Heat exchangers in heating, ventilation, and air conditioning and industrial applications requiring hot water or other hot fluids also require operation at temperatures of 70° C. or higher. The extent of retention of mechanical properties at high temperatures is dependent on the molecular composition of the polyamide. Specifically, its content of aromatic groups relative to aliphatic groups is important since this ratio influences the temperature window over which the polyamide exhibits a transition from a glassy state to a rubbery state, which is defined as the glass transition temperature (Tg) of the polyamide. These considerations will become better understood in the following description referencing the selection of polyamides in the present invention.

Each of the surface layers of the composite multi-layered article of the present invention comprises one or more aliphatic polyamides that can be processed at temperatures such that incorporation of commonly available oxidation stabilizers does not lead to excessive degradation reactions or loss of the stabilizers during the processing operation. The composite article also comprises at least one inner layer that is not exposed to one of the surfaces. At least one of the inner layers is made from a semi-aromatic polyamide. If there is more than one inner layer, the other layers may be made of aliphatic and/or semi-aromatic polyamides.

By "aliphatic polyamide" is meant polyamides formed from aliphatic and alicyclic monomers such as diamines, dicarboxylic acids, lactams, aminocarboxylic acids, and their reactive equivalents. In the context of this invention, this term also refers to copolymers derived from two or more such monomers and blends of two or more aliphatic polyamides and/or copolyamides. Linear, branched, and cyclic monomers may be used. Examples of preferred aliphatic diamines include hexamethylenediamine, 2-methylpentamethylene diamine, 1,4-diaminobutane, 2,2,4-trimethylhexamethylenediamine, 2,2,4trimethylpentamethylenediamine, 5-amino-1,3,3-trimethylcyclohexanemethylamine, and bis-aminomethylcyclohexane. Examples of preferred aliphatic dicarboxylic acids include adipic acid, azelaic acid, sebacic acid, and dodecanedioic acid. Examples of preferred aliphatic aminocarboxylic acids include 11-aminodecanoic acid, and 4-aminocyclohexyl acetic acid. Examples of preferred aliphatic lactams are caprolactam and laurolactam. The aliphatic polyamides used in this invention may optionally be derived from up to 10 mole percent of aromatic monomers as long as they meet the following criterion for processing temperature. Examples of such aromatic monomers are given below. A key consideration in the selection of aliphatic polyamides for the surface layers is their processing temperature. These aliphatic polyamides have a melting point below 280° C., meaning that they can be processed at temperatures below 295° C. These temperatures allow incorporation of commonly available oxidation stabilizers without causing excessive degradation reactions or loss of stabilizers during the processing operation. Examples of preferred aliphatic polyamides are given in Table 1b.

By "semi-aromatic polyamide" is meant polyamides formed from aromatic and, optionally, aliphatic and/or alicyclic monomers such that at least about 25 mole percent of the monomers are aromatic. In the context of this invention, this term also refers to copolymers derived from two or more such monomers and blends of two or more semi-aromatic polyamides and/or copolyamides. There is no upper limit to the percentage of aromatic monomers that can be used in the preparation of the polyamides, provided that the resulting polyamides are melt-processable. Preferred are polyamides containing up to about 65 mole percent aromatic monomers and more preferred are polyamides containing up to about 55 mole percent aromatic monomers.

By "aromatic monomer" is meant a monomer containing at least one substituted aromatic system such as a benzene ring, naphthalene, etc. Such monomers are typically diamines, dicarboxylic acids, lactams, aminocarboxylic acids, and their reactive equivalents. Examples of preferred aliphatic and alicyclic monomers are given above. Examples of preferred aromatic diamines are m-xylylenediamine, p-xylylenediamine, m-phenylenediamine, and p-phenylenediamine. Examples of preferred aromatic dicarboxylic acids and their derivatives are terephthalic acid, isophthalic acid, dimethyl terephthalate, and 2,6-naphthalenedicarboxylic acid. Examples of preferred aromatic aminocarboxylic acids include p-aminomethylbenzoic acid, 4-aminophenylacetic acid. An example of a preferred aromatic lactam is oxinadole. Polyphthalamides, which are made from terephthalic acid or isophthalic acid and an aliphatic diamine, are particularly preferred. Examples of preferred semi-aromatic polyamides are given in Table 1a.

A key consideration in the selection of a semi-aromatic polyamide is the temperature window over which it exhibits a transition from a glassy to a rubbery state (its glass transition). It is believed that this transition occurs over a range of temperatures, and is signified by a marked change in mechanical and viscoelastic properties such as stiffness, storage and loss modulus of the material. Since the transition occurs over a range of temperatures, its measurement is somewhat dependent on the technique used to measure it. Dynamic mechanical analysis (DMA) and differential scanning calorimetry (DSC) are commonly used techniques to identify a representative temperature for this transition. The higher this transition temperature, the better is the polymeric material able to retain its mechanical properties at high in-use temperatures. For the present invention, the semi-aromatic polyamide used in one or more inner layers and the one or more aliphatic polyamides used in the surface layers are selected such that the glass transition temperature of the semi-aromatic polyamide is higher than that* of the aliphatic polyamides.

Representative Tg's are given in Tables 1a and 1b and are compiled from a variety of sources. It will be readily appreciated by those skilled in the art that the measurement of Tg's is a somewhat imprecise process and, hence, that the numbers shown below are approximate and provided for purposes of illustration.

TABLE 1a

Representative Semi-Aromatic Polyamides

| Polyamide[1] | Monomers used with relative molar amounts given in parentheses | Tg (° C.) | Melting Point (° C.) |
|---|---|---|---|
| 6T/DT | HMD(50):2-MPMD(50):TPA(100) | 135 | 300 |
| 6T/66 | HMD(100):TPA(55):AA(45) | 85 | 310 |
| 6T/6 | HMD(70):TPA(70):Capro(30) | 105 | 295 |
| 6T/6I | HMD(100):TPA(70):IPA(30) | 125 | 320 |
| 6T/6I/66 | HMD(100):TPA(60):IPA(30):AA(10) | 125 | 315 |
| 9T | 1,9-Diaminononane:TPA(100) | 125 | 308 |
| MXD6 | MXD(100):AA(100) | 75 | 245 |
| 10T | DMD(100):TPA(100) | 100 | 318 |
| 12T | DDMD(100):TPA(100) | 85 | 295 |

[1]The copolyamides in this column are made from the ingredients given in the corresponding row of the second column used in the relative molar amounts indicated beside each ingredient.

TABLE 1b

Representative Aliphatic Polyamides

| Polyamide | Monomers used with relative molar amounts given in parentheses | Tg (° C.) | Melting Point (° C.) |
|---|---|---|---|
| 66 | HMD(100):AA(100) | 48 | 265 |
| 6 | Capro(100) | 41 | 220 |
| 612 | HMD(100):DDDA(100) | 45 | 220 |
| 11 | Aminoundecanoic Acid(100) | 42 | 190 |
| 12 | Laurolactam(100) | 40 | 180 |
| 610 | HMD(100):DDA(100) | 50 | 226 |
| 612 | HMD(100):DDDA(100) | 46 | 220 |

The following abbreviations have been used in Tables 1a and 1b:
HMD Hexamethylenediamine
2-MPMD 2-Methyl-1,5-pentanediamine
TPA Terephthalic acid
M Adipic acid
DMD Decamethylenediamine
DDMD Dodecamethylenediamine
Capro ε-Caprolactam
DDDA Dodecanedioic acid
DDA Decanedioic acid
IPA Isophthalic acid
MXD m-xylylenediamine
TMD Trimethyhexamethylene diamine
6T polymer molecular unit formed from HMD and TPA
DT polymer molecular unit formed from 2-MPMD and TPA
66 polymer molecular unit formed from HMD and AA
10T polymer molecular unit formed from DMD and TPA
12T polymer molecular unit formed from DDMD and TPA
6 polymer molecular unit formed from Capro
612 polymer molecular unit formed from HMD and DDDA
610 polymer molecular unit formed from HMD and DDA The aliphatic polyamides used in the surface layers of the composite article of this invention may also optionally contain oxidation stabilizers that are dispersed throughout the volume of the polyamide as uniformly as possible by the conventional means of incorporation such as melt compounding. Because of the lower melting point and correspondingly lower melt processing temperature of these polyamides, oxidation stabilizers can be easily incorporated, and do not themselves undergo excessive degradation or volatilization, nor do they cause excessive degradation of the polyamide during the incorporation step or during subsequent processing required for the manufacture of the article.

Any known antioxidants for polyamides may be used for this purpose. As described in *Plastics Additives Handbook*, edited by Gachter and Muller, three main types of stabilizers are commonly used. One type is copper salts, especially in combination with halogen and phosphorous compounds. For example, copper acetate is often used with potassium iodide/phosphoric acid at a level that provides about 10 to 200 ppm of copper and 1000 to 4000 ppm of halogen in the final polymer composition. A second type is aromatic amines such as N,N'-dinaphthyl-p-phenylenediamine or N-phenyl-N'-cyclohexyl-p-phenylenediamine, which are used at loadings of about 0.5 to 2 weight percent. A third type is hindered phenols such as N,N'-hexamethylene-bis-3-(3,5-di-tert-butyl-4-hydroxyphenyl)propionamide that are used at loadings of 0.3 to 2 weight percent.

Because the one or more inner layers are shielded from exposure to the atmosphere, it is not necessary to incorporate the oxidation stabilizers in the inner layer, and so it is possible to use semi-aromatic polyamides that have high melting points and glass transition temperatures and that maintain their physical properties at high temperatures, but which are difficult to combine with antioxidants. This provides an added benefit, as stabilizers are comparatively expensive materials and using them only in the surface layers can be a cost-effective arrangement.

Since polyamides are generally chemically compatible materials, it is not necessary to have any special adhesion or tie layers of materials to bond adjacent layers of different polyamides. They exhibit strong adhesion in melt coextruded form such that the layers cannot be separated. It is postulated that transamidation may even occur between the polymer chains of adjacent layers. The extent of transamidation will depend, among other factors, on the duration and temperature of contact in the molten state during the melt processing step.

The polyamide compositions used to make the multilayered composite articles of the present invention may further comprise additional ingredients. For example, one or more of the surface and/or inner layers may be made from a composition that further comprises fillers and/or reinforcing agents such as minerals or glass fibers. One or more of the inner layers may be made from a semi-aromatic polyamide composition or, if more than one inner layer is present, an aliphatic polyamide composition that further comprises a toughening agent. One or more of the surface layers may be made from a composition further comprising a toughening agent.

The present invention also provides a process for fabrication of the composite articles. In a multi-layer coextrusion process, separate extruders are used to extrude each type of polyamide. The temperature settings and other processing conditions for the extruders are arranged such that they are appropriate to the polyamide being extruded. This avoids having to expose the lower melting polyamides to higher than normal processing temperatures during the extrusion step while allowing the extrusion of higher melting polyamide at a suitable temperature.

The individual melts from the extrusion streams are combined together in a properly designed die and arranged in the desired multi-layer arrangement. Only the die needs to be maintained at the higher processing temperature required for the semi-aromatic polyamide used for an inner layer. Because the residence time in the die is very brief, the undesired degradative effects in the lower melting stabilized polyamide are strongly minimized. The die can be designed to provide multilayered extrudates in a variety of shapes. For example, it can be in tube, sheet, film or any other profile form. The extrudate is solidified in a cooling or a quench tank.

Because of its high glass transition temperature and rapid quenching, the inner layer may not be able to fully crystallize through this process. It may be necessary to increase the crystallinity of the inner layer to optimize the degree of retention of physical properties at elevated temperatures. The crystallinity may be increased by subjecting the article to an in-line or a separate annealing step. The annealing step can involve briefly reheating the article to a temperature slightly above the glass transition temperature of the polyamide in the inner layer and can be done in an oxygen-free environment if desired.

Articles of this invention can include, but are not limited to, pipes, tubes, tubing, and other hollow articles and sheets. Said tubes may be used in the fabrication of heat exchangers.

The invention will be become better understood upon having reference to the following Examples and accompanying Table.

EXAMPLES

Example 1

A three-layer coextruded tube with an outer diameter of 3.7 mm and a total wall thickness of 0.2 mm was made. The inner and outer surface layers were made from a high viscosity extrusion grade polyamide 66 (Zytel® 42 NC 010 sold by E.I. DuPont de Nemours, Wilmington, Del.). The surface layers contained copper-based heat stabilizers consisting of about 0.06 weight percent CuI and 0.39 weight percent KI, where both weight percents are based on the total weight of the composition. This provided a nominal 200 ppm of copper and 3500 ppm of iodine. They also contain about 0.05 weight percent, based on the total weight of the composition, of carbon black as a colorant. The thickness of the individual surface layers was 0.05 mm. The melting point of this polyamide 66 as determined by DSC is about 265° C. The inner layer was made of a toughened semi-aromatic polyphthalamide prepared from a base polyamide made from one molar equivalent of hexamethylenediamine, one molar equivalent of 2-methyl-1,5-pentanediamine, and two molar equivalents of terephthalic, into which about 15 weight percent olefinic tougheners were compounded. The melting point for the semi-aromatic polyphthalamide is about 300° C., and the glass transition temperature as measured by DSC is 135° C. The thickness of this inner layer was 0.1 mm.

The extrusion setup consisted of three individual single-screw extruders connected to a three-layer tubing die. An extruder with a single 32 mm screw available from Polysystems was used to extrude the surface layer material corresponding to the outside of the tube. An extruder with a single 25 mm screw available from Barmag was used to extrude the surface layer material corresponding to the inside of the tube. An extruder with a single 16 mm screw available from Randcastle was used to extrude the inner layer material.

The extruders for the polyamide 66 surface layers were run with barrel temperature settings of 250 to 280° C. The extruder for the semi-aromatic polyphthalamide inner layer was run with barrel temperature settings of 305 to 330° C. Metering pumps and transfer lines were used to convey the melt streams from the extruders to the die. At the tube extrusion end, the die consisted of an inner tip whose outer diameter was 7.85 mm and an outer body whose inner diameter was 8.89 mm. The die body was set at 300° C. to prevent the semi-aromatic polyphthalamide from solidifying prematurely. The three layer extrudate emerging from the die was solidified using a water tank, and pulled off by a belt puller. The line speed was about 31 m/min.

The Young's moduli and tensile strengths of the tubing samples produced this way were determined at several temperatures over the range of 23 to 190° C. using an Instron tester. 10 cm long pieces were used with a gauge distance of 5 cm between the two grips of the tester. The ends of the tubing pieces were held in the grips using specially designed V-groove jaws, and short cylindrical steel pins were inserted in the ends of the tubing to prevent the pinching and crushing of the tubing in the grips. The tests were carried out using a tester crosshead rate of 5 cm/min and stress vs. strain curves were generated. The Young's modulus was determined from the initial slope of the load displacement curve, and tensile strength was determined from the maximum stress point on the curve.

The hydrostatic burst pressure of the tubes was also measured at a number of temperatures in the range of 23° C. to 90° C. in a water bath. A burst pressure instrument supplied by Barbee Pump was used for this purpose. The instrument incorporates a hand operated water pump. One end of the tube test sample was attached to the discharge side of the pump using appropriate Swagelok® fittings. Water was first pumped into the tube with the other end open to displace the air. The open end was then capped with closed-end Swagelok® fittings for pressurization. The sample was brought to the desired test temperature by immersion in a temperature-controlled water bath for a sufficient length of time as determined by measurement of the tube surface temperature. The sample was then pressurized hydrostatically by operating the pump until failure. The maximum pressure causing failure was recorded as the burst pressure.

Tube samples were also annealed by exposing them briefly to 150° C. in a nitrogen environment. The properties of the annealed tubes were characterized as described above.

The results of the Young's modulus testing are shown in FIG. 1.

Figure 2:
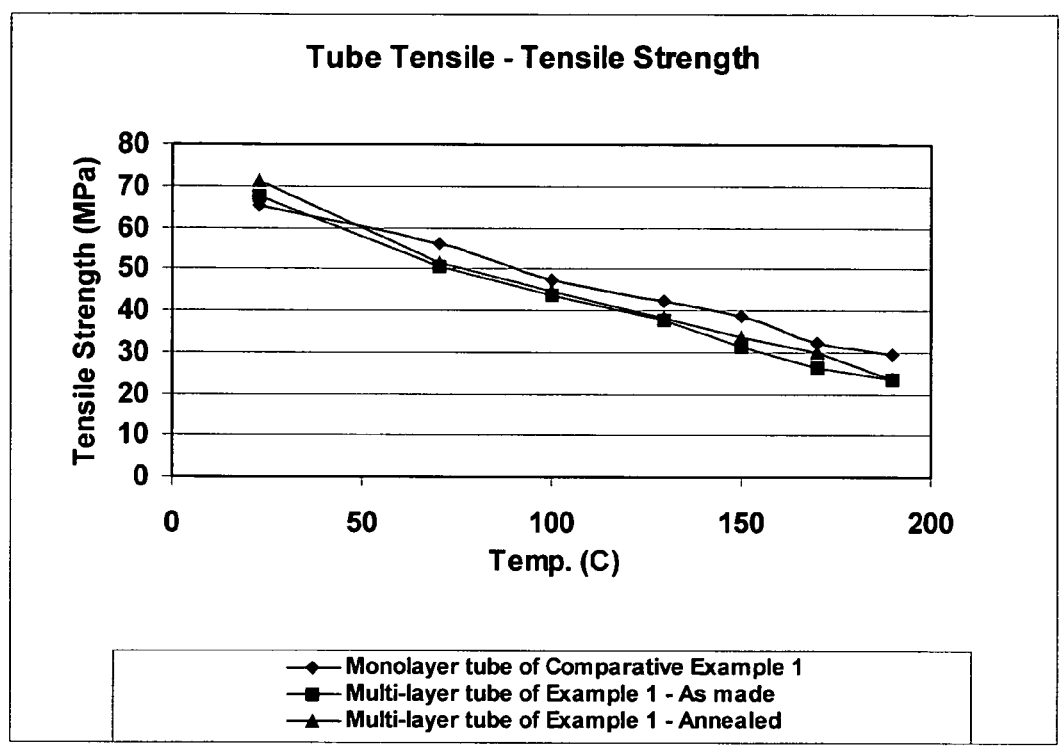
FIG. 2 is a graph depicting the variation of tensile strength with temperature of tube samples of this invention and a comparative example.

The results of the tensile strength testing are shown in FIG. 2.

The results of the burst pressure tests are shown in Table 2 below.

Comparative Example 1

For comparative purposes, monolayer tubing was made with the same overall dimensions as were used in Example 1 described above using the stabilized high viscosity PA66 that was used in Example 1. The extrusion line setup required only one extruder and a monolayer tubing die. The Polysystems® extruder mentioned above was used for this purpose with barrel temperatures set between 250 and 280° C. range, and the die temperature set at 280° C.

The tubing was characterized by tensile and burst testing at the same temperatures as were used in Example 1.

Comparative results from the testing of this monolayer tubing are shown in FIGS. 1 and 2 and Table 2 below.

TABLE 2

Variation of Burst Pressure of Tube Samples with Temperature

| Tube | Temp. (C.) | Test Conditions | Burst Pressure (bars) |
| --- | --- | --- | --- |
| Monolayer tube Of Comparative Example 1 | 23 | Dry | 50.6 |
|  | 23 | In water bath | 54.9 |
|  | 50 | In water bath | 25.3 |
|  | 89 | In water bath | 12.2 |
| Multi-layer tube Of Example 1 As-made | 23 | Dry | 57.1 |
|  | 23 | In water bath | 58.1 |
|  | 50 | In water bath | 28.8 |
|  | 89 | In water bath | 13.3 |
| Multi-layer tube Of Example 1 Annealed | 23 | Dry | 77.4 |
|  | 23 | In water bath | 65.6 |
|  | 50 | In water bath | 37.9 |
|  | 89 | In water bath | 22.5 |

From the results, it will be seen that the multilayered tube with the surface layers of the aliphatic polyamide 66 and the inner layer of semi-aromatic polyphthalamide exhibits much better retention of stiffness and burst properties with temperature than the monolayer tube. Also, because the polyphthalamide layer is encapsulated between the surface layers of appropriately stabilized polyamide 66, incorporation of stabilizers in the inner layer is not required.

What is claimed is:

1. A multilayered article comprising a plurality of layers of polyamides and arranged to include two surface layers and one or more inner layers, and wherein said surface layers further comprise one or more aliphatic polyamides wherein the aliphatic polyamides contain one or more oxidation stabilizers and wherein at least one of said inner layers comprises a semi-aromatic polyamide derived from at least about 25 mole percent of aromatic monomers wherein the semi-aromatic polyamide does not contain oxidation stabilizers.

2. The multilayered article of claim 1 wherein said oxidation stabilizers are selected from the group consisting of copper salts, aromatic amines, and hindered phenols.

3. The multilayered article of claim 1 wherein said aliphatic polyamides have melting points below 280° C.

4. The multilayered article of claims 1 or 2 in the form of a tube.

5. A heat exchanger incorporating the multilayered article of claims 1 or 2 in the form of a tube.

* * * * *